United States Patent [19]

Hayward et al.

[11] 4,018,901

[45] Apr. 19, 1977

[54] STABILIZED HIGH PROTEIN FOOD BAR

[75] Inventors: James R. Hayward, McHenry; William L. Keyser, East Dundee; Walter J. Zielinski, Ingleside, all of Ill.

[73] Assignee: The Quaker Oats Company, Chicago, Ill.

[22] Filed: Aug. 2, 1976

[21] Appl. No.: 710,452

[52] U.S. Cl. .................................. 426/72; 426/99; 426/571

[51] Int. Cl.² ...................... A23J 3/02; A23G 3/00

[58] Field of Search ............. 426/72, 99, 571, 103, 426/660

[56] References Cited

UNITED STATES PATENTS

| | | | |
|---|---|---|---|
| 2,520,581 | 8/1950 | Turner et al. | 426/571 |
| 2,929,715 | 3/1960 | Sutton | 426/571 |
| 3,490,920 | 1/1970 | Grettie | 426/571 |
| 3,607,309 | 9/1971 | Olney | 426/571 |
| 3,682,659 | 8/1972 | Jurczak | 426/571 |
| 3,684,528 | 8/1972 | Batey | 426/571 |

*Primary Examiner*—Jeanette M. Hunter
*Attorney, Agent, or Firm*—Charles J. Hunter; Donnie Rudd

[57] ABSTRACT

A marshmallow product is disclosed for use in producing stabilized, high protein food bars. The product includes a marshmallow having a density of from 30 to 74 oz. per gallon in intimate admixture with a mixture of polyhydric alcohol, non-reducing sugar and high protein ingredients of reduced water binding capability with the high protein ingredients including heat treated protein and fat coated protein. The marshmallow product has a water activity, $A_w$, less than 0.85. The marshmallow product may also include fat coated vitamins.

8 Claims, No Drawings

STABILIZED HIGH PROTEIN FOOD BAR

BACKGROUND OF THE INVENTION

1. Field of the Invention

This invention relates to a stabilized, high protein food bar having a marshmallow matrix as a base.

2. Description of the Prior Art

The basic process for the production of marshallow as it is known today was shown in U.S. Pat. 2,600,569 to E. T. Oakes in 1952. This invention was the first showing of the injection of gas into a marshmallow mix to cause it to puff upon release of gas pressure. Since that time, many patents have issued showing different additions to marshmallows to provide different flavoring or other features. While U.S. Pat. No. 3,684,528 showed the inclusion of non-fat milk solids into a marshmallow, it showed the mixing thereof with other materials such as reducing sugar, salt and vanilla concentrate. The inclusion of fats in marshmallow is not a new and novel idea either. In U.S. Pat. No. 3,556,012 a thorough discussion of the inclusion of fats in marshmallow is presented with the fats in this case being cocoa butter fat.

Likewise, the inclusion in and of itself of polyhydric alcohols, in small amounts, in marshmallow is not new. In U.S. Pat. No. 3,018,183, sorbitol in an amount up to 1/4% in a marshamallow is shown. In U.S. Pat. No. 3,490,920, various polyhydric alcohols are added to a marshmallow in an amount up to 4% by weight of the gelatin, making an overall polyhydric content of somewhat less than 4% by weight. In U.S. Pat. No. 3,582,357, propylene glycol fatty monoesters and glycerol fatty acid monoesters are added to marshmallow to induce whipping therein. Generally, polyhydric alcohols in fairly large amounts have been regarded as creating problems in marshmallows. Likewise, the inclusion of fats in marshmallows has generally been regarded as something to be avoided and has required special processing conditions before fat required for flavoring could be included therein. Additionally, the inclusion of fat-coated proteins into marshmallow has not been shown. While casein has been mixed in marshallows which contains small amounts of shortening, the casein has never been enrobed with fat until it loses its water binding properties prior to inclusion therein. Additionally, there is no showing of the inclusion of large amounts of heat treated proteins of reduced water binding such as soy protein isolate or soy protein concentrate, in marshmallow products. Given the prior art teaching of the undesirability of including fairly large quantities of fats, polyhydric alcohols, and the like in marshmallows, there has not been shown any combination of any amounts of these ingredients which combined together could produce a fairly large total amount of ingredients in a marshmallow matrix which could then be molded into a food bar. This invention makes use of a combination of ingredients in a marshmallow with the ingredients being those ingredients normally taught in the prior art as being unacceptable in significant amounts in a marshmallow.

SUMMARY OF THE INVENTION

It is an object of this invention to provide a marshmallow product useful in stabilized high protein food bars.

It is an additional object of this invention to provide a process for producing enriched food bars containing a marshmallow matrix which has been vitamin enriched.

It is an additional object of this invention to provide a stable, packaged marshmallow based, high protein food bar.

Further objects and advantages will appear in the course of the following description.

DESCRIPTION OF THE PREFERRED EMBODIMENTS

The objects of this invention are accomplished by a marshmallow product comprising: marshmallow having a density of from 30 to 74 ounces per gallon in intimate admixture with a mixture of polyhydric alcohol, non reducing sugar and high protein ingredient of reduced water binding capability, said high protein ingredients including heat treated protein or fat coated protein or a combination of heat treated protein and fat coated protein. Said heat treated protein being selected from the group consisiting of animal protein, vegetable protein, casein, caseinate salts and combinations thereof. Said fat coated protein being selected from the group consisting of animal protein, vegetable protein, casein, caseinate salts and combinations thereof. Said marshmallow product having a water activity, $A_w$, less than 0.85.

Preferably, the marshmallow product described above further includes within the marshmallow itself an added amount of fat coated vitamins.

The objects of this invention are additionally accomplished by:

A process for producing an enriched marshmallow, said process comprising:

A. preparing a marshmallow mix;

B. adding air thereto and mixing the marshmallow mix and air until the density at atmospheric pressure is from 30 to 74 ounces per gallon;

C. reducing any remaining pressure on the mixture to atmospheric pressure while maintaining the density at from 30 to 74 ounces per gallon;

D. adding a mixture of polyhydric alcohol, non reducing sugar and high protein ingredient of reduced water binding capability to the mixture while maintaining the density between 111 and 119 ounces per gallon and while maintaining the water activity, $A_w$, less that 0.85; and E. allowing the marshmallow to set.

Preferably, in the above, the high protein ingredients are selected from the group comprising heat treated protein or fat coated protein or a combination of heat treated protein and fat coated protein. Said heat treated protein can be selected from the group consisting of animal protein, vegetable protein, casein, caseinate salts and combinations thereof. Said fat coated protein can be selected from the group consisting of animal protein, vegetable protein, casein, caseinate salts and combinations thereof.

The objects of this invention are preferably accomplished when the marshmallow, prior to setting, has incorporated therein fat coated vitamins. Preferably, the fat coated vitamins are prepared by mixing a mixture of vitamins and fatty material with a liquid or solid cooling agent, said cooling agent being admixed in an amount sufficient to solidify the mixture and maintain the mixture solidified throughout the coating process, said cooling agent being non-toxic and being chemically inert with respect to the vitamins and fatty material; subdividing the mixture until a major portion thereof passes through a No. 20 U.S. Sieve but has a particle size above about 75 microns in diameter; and removing the cooling material therefrom by sublimation or evaporation; said fatty material comprising a saturated aliphatic acid having between 12 and 20 carbon atoms inclusive or a glyceride having the formula:

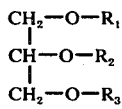

wherein $R_1$ is an acyl radical derived from a saturated aliphatic acid having between 12 and 20 carbon atoms per molecule and $R_2$ and $R_3$ are hydrogen or the same as $R_1$, and said fatty material having a melting point of from 100° F. to 200° F.

The objects of this invention are further accomplished by the combination including a set marshmallow product having a density of from 30 to 74 ounces per gallon and being in intimate admixture with a mixture of polyhydric alcohol, non reducing sugar, and high protein ingredients having reduced water binding capability, said set marshmallow having a water activity, $A_w$, less than 0.85, a hermetically sealed container completely encircling the marshmallow; a water converting catalyst within the confines of the container and an atmosphere surrounding the food product in the container; and an atmosphere comprising no more than about 4 % by weight oxygen and the remainder of the atmosphere comprising an inert gas and sufficient hydrogen to combine with all the oxygen and convert it to water.

The above combination preferably also includes vitamins that are fat coated as described above. Preferably, the vitamins used in each of the above-described embodiments includes vitamin C.

Marshmallow is an aerated food product usually composed of various saccharides, water, gelatin and flavoring agents. Although optional, marshmallow may also contain edible coloring and other minor edible ingredients such as edible humectants.

Marshmallow syrup is the mixture of ingredients that is aerated and whipped to form marshmallow. By use herein of the terms "marshmallow mix" and "marshmallow syrup", we intend to refer to a marshmallow syrup. Depending on the method for marshmallow production, marshmallow syrup usually has a moisture content of about 16 to 30 percent by weight, very little of which is lost in processing. A more detailed description of marshmallow syrup is found later on in this discussion.

Marshmallow syrup generally has a density of approximately 127 ounces per gallon. In the production of marshmallow, marshmallow syrup is whipped and intermixed with an inert, edible gas such as air or nitrogen until the denisity of the mixture is approximately 44 ounces per gallon. This volumetric expansion, i.e. volume increase of 2 to 3 times, gives marshmallow the characteristic spongy texture which consumers desire. In fact, these spongy and lowdensity texture characteristics are so common to marshmallow that consumers will not accept a product lacking in them.

Many different flavoring agents have been utilized to alter the taste of marshmallow. These flavoring agents have heretofore been required to have low fat contents and be used in such small quantities that the final marshmallow product has a very low fat content, i.e. usually below 1.0 percent by weight fat. This low fat content has been required in order to prevent excess fat from precluding expansion during whipping and aeration. Since the marshmallow whip is essentially a mixture of ingredients mixed with and whipped with water, very small quantities, i.e. above 1 percent by weight, of fats or oils have heretofore broken this whip preventing the required product expansion. This is obvious since oils or fats and water do not readily mix and thus would not be thought to be a combination which could be whipped. While some attempts have been made to increase the oil or fat level in marshmallow, these attempts have generally been through the addition of certain additives which prevent the oil from breaking the foam or whip. While these attempts have met minor success in providing incremental increases in fat content, the additional additives have created an off-taste or foreign taste which has made the marshmallow product unacceptable.

A marshmallow mix for use in production herein includes various ingredients which, as described above, include various primarily non reducing saccharides, water, gelatin, and flavoring agents. By use of the term "gelatin" we intend to mean a gelatinous material obtained from animal tissues by prolonged boiling or any of the various substances resembling gelatin in physical properties. Gelatin is sold on the basis of bloom test or jelly test and gelatin having a bloom test or jelly test of from 150-300 grams is normally considered acceptable for marshmallow production. It is usually preferred, however, to use from 1.5 to 2.5 percent by weight of a gelatin having a bloom test of from 225-250 grams with variations in bloom test values being compensated for by using less gelatin as the bloom test value increases.

By use herein of the term "marshmallow mix" it is intended to mean those mixed ingredients which are whipped and aerated to produce marshmallow. These include the marshmallow syrups known in the industry, and include by reference the description found in the Krohn and Polito patent, U.S. Pat. No. 3,556,812, modified to provide a minimum, i.e. below 5 percent by weight, of reducing sugars.

The process of this invention, when the requirement is for the mixing of air with the marshmallow mix until the atmospheric pressure density thereof is from about 30–74 ounces per gallon, is intended to mean those processes in which air can be injected or whipped into the marshmallow mix to give it the requisite density. For instance, the Oakes type gas injection system, as previously referred to, is perfectly acceptable. Additionally, the whipping therein of air by a simple wire mixer can be sufficient so long as sufficient air is included in the product to insure the requisite density. Additionally, other new types of marshmallow equipment well known in the industry are now capable of inserting or injecting sufficient amounts of air into the marshmallow while mixing it to provide, at atmospheric pressure, the requisite density. If the mixing is not at atmospheric pressure, then prior to the casting or setting thereof the pressure must be reduced until it is approximately atmospheric.

Marshmallow mixes that may be used in this invention are the normal marshmallow mixes well known in the industry. Ingredients used in marshmallow production as well as amounts thereof are well known in the marshmallow industry. Among the formulas that are acceptable for marshmallow production are those found in the following: *Candy Making As a Science and Art* by Claude D. Barnette, Don Guessel Publications, Inc., New York, 1960 pp. 99–103 and Encyclopedia of Candy and Ice Cream Making, by Simon I. Leon, Chemical Publishing Co., New York, 1959, pp. 294–304; and a *A Textbook on Candy Making*, by Alfred E. Leighton, Manufacturing Confectioners Publishing Co., Oak Park, Illinois, 1952, pp. 55–68. A typical formula for use herein would include about 60–75 percent by weight sucrose, about 15–25 percent by weight water, about 2–5 percent by weight invert sugar; and about 1–4 percent by weight gelatin. The typical formula may also include some alterations of the formula such as replacing part of all reducing sugars and syrups with non reducing sugars and syrups. Various flavoring agents and humectants may also be added in minor amounts. Preferably, in this invention, the marshmallows mix has about 80.1 percent by weight sucrose, about 18.3 percent by weight water, about 1.2 percent by weight gelatin, and about 0.4 percent other ingredients such as flavoring, coloring and preservatives.

The density of the final marshmallow product produced by this invention must be from 111–119 oz. per gallon at atmospheric pressure, and sufficient air must be inserted therein to produce this requisite density effect. When referring to density of the product, it is intended to refer to the density of atmospheric pressure, i.e., gas pressure removed unless it is otherwise stated.

It is preferred to maintain the aerated marshmallow mixture at a temperature of from about 80° F. to about 90° F. during the processing, however, such other temperatures as may be commmonly used in the marshmallow industry are acceptable outside of this preferred range. The marshmallow of this invention includes therein a mixture of polyhydric alcohols, non reducing sugar, and high protein ingredient of reduced water binding capability. In addition, the mixture may include fat-coated vitamins as a preferable embodiment. The high protein ingredients may be fat-coated protein such as casein or caseinate salts but may also include heat treated protein such as heat treated oil seed vegetable protein, which has been heat treated to the extent that its water binding capacity is substantially reduced. If the protein is not some way treated to reduce the water binding capability thereof then the usage of the ingredients in this invention is destroyed.

The food bar base of this invention must be include a high protein ingredient of reduced water binding capability, i.e. above 30 % protein. The high protein ingredient can be either a fat coated protein, or protein which has been heat treated to substantially reduce the water binding capability, or a combination of the two.

When the high protein ingredients are fat coated, they are coated with a fat which has a melting point of less than 120° F. The coating must be applied prior to inclusion of the high protein ingredients in the product and cannot simply be mixed with a fat containing mixture to produce an acceptable product.

The high protein ingredients may be heated to denature the protein therein and gelantinize the remaining starch therein until the water binding capacity of the protein ingredients are substantially reduced. Of course, the heating cannot be so severe that it destroys the protein efficiency ratio substantially. We have found that heating at a temperature of 350° F. for ½ to 1½ minutes produces the desired results. Other such times and temperatures that produce an equivalent result are acceptable. It is well within the skill of one knowledgeable in the art of heat treating protein materials to obtain an equivalent result with different times and temperatures, however, optimum conditions are as stated above.

The product of this invention includes polyhydric alcohols and sugar, a major portion of which is non reducing sugar, in the marshmallow product. By use herein of the term "sugar"it is intended to mean any saccharides which are soluble in water to an extent that the osmotic pressure of the water solution of such a saccharide will provide a water activity coefficient $A_w$, of less than 0.85. In addition, the saccharide is required to be non-toxic. The saccharide must not provide any undesirable taste when used in the requisite concentration. It is preferred that sugar be a low molecular weight sugar since sugars of lower molecular weight have more effect on osmotic pressure. Among the sugars that may be used for this invention are the water soluble mono-saccharides, the reducing and non-reducing polysaccharides and their degradation products such as pentoses, aldo pentoses, methyl pentoses, keto pentoses, e.g. xylose and arabinose, rhamnose, hexoses and reducing polysaccharides; aldo hexoses like glucose, galactose and mannose; the ketohexoses including fructose and sorbose; the disaccharides including maltose and lactose. It must be emphasized, however, that no more than about 5% by weight reducing sugars can be used, and preferably the reducing sugars are kept below 2% by weight. If the reducing sugars substantially exceed this amount the effect on the protein will be such as to render the product unacceptable.

The polyhydric alcohols, used herein are nontoxic and do not adversely affect the taste in the concentrations specified. By the term "polyhydric alcohols"it is generally intended to mean alcohols with three or more hydroxyl groups and having the general formula $HOCH_2(CHOH)_mCH_2OH$ where m is a number from 1–5. Generally, these polyhydric alcohols are water soluble, have small optical rotation in water and have some sweetness to taste. Among the polyhydric alcohols that may be used in this invention are the following:
tritols:
  glycerol
tetritols:
  erythritol
  D-threitol:
  L-threitol
  D,L-threitol
pentitols:
  ribitol
  xylitol
  D-arabitol
  L-arabitol
hexitols:
  allitol
  dulcitol
  sorbitol (D-glucitol)
  L-glucitol
  (D,l-glucitol
  D-mannitol
  L-mannitol
  D,L-mannitol
  D-talitol
  L-talitol D,L-talitol
D-iditol
L-iditol
heptitols:
 glycero-gulo-heptitol
 D-glycero-D-ido-heptitol
 perseitol
 volemitol The term "polyhydric alcohols" also includes the higher sugar alcohols. Glycerol, propylene glycol, and 1,3-butanediol are also acceptable polyhydric alcohols for use in this invention.

The protein should be added after the gas injection but may be added at any time that does not destroy the whip of the mix. It may, therefore, be mixed in or folded in while under gas pressure, or added after pressure is reduced. The polyhydric alcohol may be added prior to expansion of the marshmallow mix, but it may also be added at any time prior to setting.

The products of this invention may also include incorporation in the marshmallow of a fat coated vitamin. The fat coated vitamin may be added prior to expansion of the marshmallow mix or may be added after expansion an prior to setting.

It is preferred, in using vitamins in this invention, that the vitamins be mixed with a fatty material and with a liquid or solid cooling agent with a cooling agent being admixed in an amount sufficient to soldify the mixture and maintain it solidified throughout the coating process. The cooling agent must be non-toxic and must be chemically inert with respect to the vitamins and fatty material. After the fatty material, vitamins, and cooling agent are mixed and solidified, the mixture is subdivided until a major portion thereof passes through a No. 20 U.S. Sieve but has a particle size above about 75 microns in diameter. After subdivision the cooling material is removed therefrom by sublimation or evaporation. The preferred cooling agents for use in this invention are solid carbon dioxide, i.e., dry ice, or liquid nitrogen. The fatty material for use in coating the vitamins as well as for use in coating the proteinaceous material of this invention comprises a saturated aliphatic acid having between 12 and 20 carbon atoms inclusive or a glyceride having the formula:

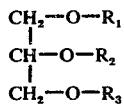

wherein $R_1$ is an acyl radical derived from a saturated aliphatic acid having between 12 and 20 carbon atoms per molecule and $R_2$ and $R_3$ are hydrogen or the same as $R_1$ and the fatty material having a melting point of from 100° F. to 200° F.

After a marshmallow mix is prepared in this invention containing the polyhydric alcohol and non reducing sugar, it is them mixed with air until the atmospheric pressure density thereof is from 30–70 oz. per gallon. That is, when the pressure, if such exists on the marshmallow, is reduced, the marshmallow will expand until it has a requisite density of from 30–74 oz. per gallon. Likewise, if the mixing is at atmospheric pressure, the air must be mixed until the product has the requisite density. If any pressure is on the product then, it must be reduced until it is at atmospheric pressure. The high protein ingredient is then preferably mixed therein and the mixture is then allowed to set. The formation of the marshmallow product in this invention may be done according to the method shown in the Oakes patent hereinbefore described. In such a case as using the Oakes type marshmallow foaming mechanism, the materials can all be admixed with the proper treatment for reduced water binding capability prior to mixing and these can be added prior to the gas injection if small enough amounts are used to prevent loss of whip, or the gas injection may be placed in and the marshmallow expanded and the materials folded into the expanded mix. It is preferable, however, to put the polyhydric alcohol in prior to mixing along with the non reducing sugar. The high protein ingredients that have been fat coated, must be added after gas injection. When oil seed vegetable protein is included in the mix, it is preferable to include it after the gas pressure has been removed. Additionally, if the oil seed vegetable protein, polyhydric alcohol, and casein are blended together, this blend is folded into the expanded mixture prior to setting.

In this process, the marshmallow product thus produced is preferably inserted into a container along with a water-converting catalyst. The water-converting catalyst can be any of the known catalysts that are inert with respect to the product and which are also non-toxic when included in a food package. It has been found, for instance, that it is desirable to use a noble metal catalyst, including such things as palladium and platinum catalysts, which are well known to covert a mixture of oxygen and hydrogen to water. By use herein of the term "water converting catalyst" it is intended to mean any catalyst which will convert a mixture of hydrogen and oxygen to water and which is inert with respect to the food product. The catalyst can be sandwiched betweeen air permeable strips or sprayed onto the container or insert or added in any manner that will not contaminate the product but will contact the atmosphere in the container. After the product is inserted into the container with the water converting catalyst, the atmosphere thereon must be displaced with a hydrogen containing atmosphere containing not more than about 4% by weight oxygen. In this case, the hydrogen containing atmosphere must be an inert gas, inert with respect to the product, and non-toxic, and having sufficient hydrogen to combine with the oxygen, and preferably with an excess so there is insurance that all the oxygen is converted. Nitrogen has been found to be a highly acceptable inert atmosphere for inclusion with the hydrogen. The displacing of the atmosphere with the inert gas and nitrogen can be a displacement using a flushing system which flushes completely the surrounding atmosphere in the container, or may be a double flushing system or a combination of vacuum and flushing relief, or any such combination so long as the end goal of removal of all or substantially all of the oxygen is achieved. Thereafter, the container is sealed to prevent further oxygen from reaching the product. At such time, gradually over the containing of the product, the catalyst converts the oxygen and hydrogen to water, and the produced water may be absorbed by the product or merely retained in the container. The amount of produced water is so small that it does not have a harmful effect on the product, and it is stabilized by the inclusion of non reducing sugar, protein, and polyhydric alcohol in the product. In such a case, no oxygen is remaining in the free state for combination with the protein, the unsaturated fatty acids or the vitamins to render them ineffective or to degrade them. Additionally, the benefits of the product are such that it does not degrade due to oxygenation of any of the material or ingredients within the marshmallow, and, additionally, the sealing of the container prevents the marshmallow from losing its moisture and becoming hard.

The principal reason for maintaining a low oxygen atmosphere is to prevent mold growth. It should be noted that bacteria and yeast do not grow below a water activity, $A_w$, of 0.85, however, mold will grow at that $A_w$, and is controlled in this invention by reducing the oxygen in the package atmosphere to less than 1%.

DESCRIPTION OF THE PREFERRED EMBODIMENTS

This invention may be more fully described but is not limited by the following examples.

EXAMPLE 1

A marshmallow mixture is prepared. For the marshmallow mixture 0.927 parts by weight gelatin (Bloom test strength 250 grams) is added to a first jacketed kettle containing 8.2 parts by weight water. The gelatin is allowed to soak in the water for 5 minutes and then steam is introduced into the first jacketed kettle until the temperature of the mixture is 145° F. While maintaining the mixture at 145° F., the mixture is stirred until all the gelatin is dissolved in the water. The mixture is then set aside for inclusion in the process. This mixture is referred to as the gelatin mix.

The marshmallow premix is prepared in a second jacketed kettle. For the marshmallow premix, 8.3 parts by weight water, 0.067 parts by weight preservative, 77.2 parts by weight sucrose, 0.46 parts by weight flavoring (vanilla), and 0.21 parts by weight color are added to the second jacketed kettle.

The marshmallow mixture, marshmallow premix and five parts by weight sorbitol are throughly mixed until the mixture is uniform throughout with regard to each of the ingredients. This mixture is then circulated through a heat exchanger and the temperature is reduced to about 75° F. and maintained at that temperature. The mixture is then introduced as a continuous stream into an Oakes continuous marshmallow mixer and beater (E. T. Oakes Corporation, Islip, N.Y.). The mixture is adjusted so that the aerated marshmallow mixture leaving the mixer is at a temperature of 85° F. plus or minus 3° F. Air or an inert is injected into the mixture and the flow rate and pressure of the gas are adjusted until samples of the product exposed to atmospheric pressure have a density of about 45–55 oz. per gallon. The pressure of the aerated mixture leaving the mixer fluctuates within the range of about 40–60 psig. The mixture is then introduced into the atmosphere whereupon it expands and has a density of about 50 oz. per gallon. Casein in an amount of 10 parts by weight is mixed with a vegetable fat until the water binding ability of the Casein is substantially reduced. Soy protein concentrate is heated to 350° F. for one minute to substantially reduce its water binding capability. Five parts by weight of the Casein and five parts by weight of the heat treated soy protein concentrate are then folded in the aerated marshmallow mix. The mixture is then allowed to set. The uniformly blended mixture has a moisture content of about 28% by weight, a density of about 111–119 oz. per gallon. a sweet marshmallow flavor, a firm moist spongy characteristic marshmallow texture and a high quality of protein therein.

EXAMPLE 2

Example 1 is repeated with the exception that a vitamin mix is prepared by adding vitamin C to a fatty material having a melting point above 100° F. and then mixing this with solid carbon dioxide in an amount of about 4 times by weight of the vitamin C and fatty materials. This mixture is then thoroughly mixed and passed through a screen to give a particle size distribution such that it will pass through a No. 20 U.S. Sieve but has a particle size above about 75 microns. The dry ice is then allowed to sublime off the mixture giving a fat coated vitamin C. About one-half parts by weight of this vitamin mixture is mixed into the marshmallow mix, and the marshmallow process of Example 1 is continued to give a quality product of good taste. The vitamin taste normally characteristic of vitamins is not found due to the fat coating of the vitamins.

EXAMPLE 3

Example 1 is repeated with the exception that after the product is produced, it is placed in a container along with a palladium catalyst. The palladium catalyst is sandwiched between two layers of polyethylene which are permeable to the air or atmosphere. The container is then flushed with a mixture containing 1 part by weight hydrogen and 12 parts by weight nitrogen. After double flushing with this gas the product is then sealed in the container to prevent further oxygen from entering the container. After a period of time, the product is found to have high quality and taste and the vitamin and proteins added thereto are found to be very stable.

EXAMPLE 4

Example 2 is repeated with the conditions defined in Example 3. Again, a high quality product is produced.

It may thus be seen that the invention described herein produces a new and novel marshmallow products making use of a multiplicity of treated products each of which were taught in the prior art to the unacceptable for inclusion into marshmallows. The marshmallow product of this invention combines all of the failings of the prior art in one synergist effect to produce a marshmallow base which is high in nutritional qualities, due to inclusion of large amounts of protein therein, and which also has stablized vitamins therein. Thus, the new and novel product of this invention accomplishes what the prior art failed for some time to accomplish.

Having fully described this new and unique invention the following is claimed:

1. A marshmallow base product comprising marshmallow having a density of from 30 to 74 ounces per gallon non reducing sugar, and a high protein ingredient of reduced water binding capability said high protein ingredient including a heat treated protein or a fat coated protein or a combination of heat treated protein and fat coated protein; said heat treated protein being selected from the group consisting of animal protein, vegetable protein, casein caseinate salts and combinations thereof; said fat coated protein being selected from the group consisting of animal protein, vegetable protein, casein, caseinate salts and combinations thereof; said marshmallow base product having a water activity, $A_w$, less the 0.85 and a final density of from 111 to 119 ounces per gallon.

2. A marshmallow base product as in Claim 1 further including fat coated vitamins.

3. A process for producing an enriched marshmallow base product, said process comprising:
   A. preparing a marshmallow mix;
   B. adding air thereto and mixing the marshmallow mix and air until the density at atmospheric pressure is from 30 to 74 ounces per gallon;
   C. reducing any remaining pressure on the mixture to atmospheric pressure while maintaining the density at from 30 to 74 ounces per gallon;
   D. adding a mixture of polyhydric alcohol, non reducing sugar, and high protein ingredient of reduced water binding capability to the mixture while maintaining the density between 111 to 119 ounces per gallon and while maintaining the water activity, $A_w$, less than 0.85, and
   E. allowing the marshmallow base product to set.

4. A process as in claim 3 wherein the high protein ingredient is a member selected from the group consisting of heat treated vegetable protein, heat treated casein, heat treated caseinate salts, heat treated animal protein, fat coated animal protein, fat coated vegetable protein, fat coated casein, fat coated caseinate salts and combinations thereof.

5. A process as in claim 3 further including admixing a fat coated vitamin in the marshmallow prior to setting.

6. A process as in claim 5 wherein the fat coated vitamin is prepared by mixing a mixture of vitamins and fatty material with a liquid or solid cooling agent, said cooling agent being admixed in an amount sufficient to solidify the mixture and maintain the mixture solidified throughout the coating process, said cooling agent being non-toxic and being chemically inert with respect to the vitamins and fatty material; subdividing the mixture until a major portion thereof passes through a No. 20 U. S. Sieve but has a particle size above about 75 microns in diameter; and removing the cooling material therefrom by sublimation or evaporation; said fatty material comprising a saturated aliphatic acid having between 12 and 20 carbon atoms inclusive or a glyceride having the formula:

$$CH_2\text{-}O\text{-}R_1$$
$$CH\text{-}O\text{-}R_2 \quad CH_2\text{-}O\text{-}R_3$$

wherein $R_1$ is an acyl radical derived from a saturated aliphatic acid having between 12 to 20 carbon atoms per molecule and $R_2$ and $R_3$ are hydrogen or the same as $R_1$, and said fatty material having a melting point of from 100° F to 200° F.

7. In a combination: a set marshmallow based product having a density of from 111 to 119 ounces per gallon and said marshmallow based product comprising, marshmallow, polyhydric alcohol, non reducing sugar, and high protein ingredients of reduced water binding capability; said set marshmallow based product having a water activity, $A_w$, less than 0.85; a hermetically sealed container completely encircling the marshmallow based product; a water converting catalyst within the confines of the container; and an atmosphere surrounding the food product in the container; said atmosphere comprising no more than about 4 percent by weight oxygen and the remainder of the atmosphere comprising an inert gas and sufficient hydrogen to combine with all the oxygen and convert it to water.

8. The combination as in claim 7 further including fat coated vitamins in the marshmallow based product.

* * * * *

UNITED STATES PATENT OFFICE
CERTIFICATE OF CORRECTION

PATENT NO. : 4,018,901
DATED : April 19, 1977
INVENTOR(S) : James R. Hayward, William L. Keyser & Walter J. Zielinski It is certified that error appears in the above-identified patent and that said Letters Patent are hereby corrected as shown below:

In Claim 1, at column 10, line 58, insert after gallon and before non reducing sugar, --in intimate admixture with a mixture of polyhydric alcohol,--.

In Claim 1, at column 10, line 64, insert after casein and before caseinate, --,--.

In Claim 1, at column 11, line 1, "the" should read --than--.

In Claim 6, at column 12, lines 10 to 12, the formula should appear as follows:

$$\begin{array}{l} CH_2-O-R_1 \\ CH-O-R_2 \\ CH_2-O-R_3 \end{array}$$

Signed and Sealed this

Fourth Day of April 1978

[SEAL]

Attest:

RUTH C. MASON
Attesting Officer

LUTRELLE F. PARKER
Acting Commissioner of Patents and Trademarks